United States Patent Office 3,842,094
Patented Oct. 15, 1974

3,842,094
2-(N-PROPARGYL)-PHTHALIMDOACETAMIDO-5-HALOBENZOPHENONES
Ctirad Podesva, Montreal, Quebec, Canada, and Kitty Vagi, Fort Lauderdale, Fla., assignors to Delmar Chemicals Limited, Ville La Salle, Quebec, Canada
No Drawing. Filed Aug. 31, 1972, Ser. No. 285,369
Int. Cl. C07d 27/52
U.S. Cl. 260—326 N                2 Claims

ABSTRACT OF THE DISCLOSURE 1,4-Benzodiazepine derivatives of the general formula:

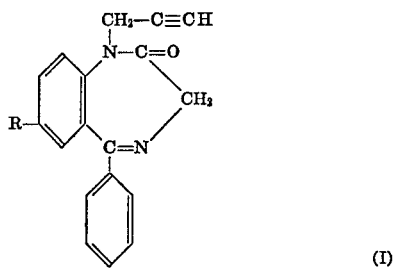

wherein R represents hydrogen, halogen, nitro or trifluoromethyl and medicinally acceptable non-toxic acid addition salts thereof, which have significant C.N.S. and muscle relaxant effects, and pharmaceutical compositions containing such compounds. Also disclosed are 2-(N-propargyl)-phthalimdoacetamido-5-halobenzophenones useful as intermediates in the synthesis of the benzodiazepine compounds.

BACKGROUND OF THE INVENTION (a) Field of Invention

This invention relates to novel chemical compounds and to processes for their manufacture. More particularly, this invention is concerned with (i) certain novel benzodiazepine derivatives with useful pharmacological properties in that they act as depressants on the central nervous system, (ii) certain novel compounds useful as intermediates in the synthesis of benzodiazepine derivatives, (iii) processes for converting the intermediates into the benzodiazepine derivatives, and (iv) pharmaceutical compositions containing, as an active ingredient, one or more of the novel benzodiazepine derivatives.

(b) Prior Art

The benzodiazepine derivatives of this invention fall within a class of known 1,4-benzodiazepine compounds best exemplified by the compound, diazepam, which has the following structural formula:

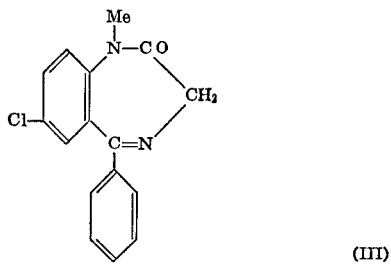

Diazepam, the proper chemical name of which is 7-chloro-1-methyl-5-phenyl-3H-1,4-benzodiazepin-2(1H)-one, is a well known psychotherapeutic agent widely used as a tranquilizer and skeletal muscle relaxant (see page 341 of the 8th (1968) edition of "The Merck Index").

SUMMARY OF THE INVENTION

The 1,4-benzodiazepine derivatives provided by this invention are compounds of the following general formula:

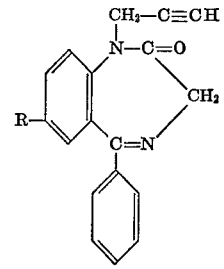

wherein R represents hydrogen, halogen, nitro or trifluoromethyl and medicinally acceptable, non-toxic acid addition salts thereof.

A highly preferred compound according to this invention is 7-chloro - 1 - propargyl-5-phenyl-3H-1,4-benzodiazepin-2(1H)-one. In standard pharmacological testing, this compound has been demonstrated to possess marked C.N.S. depressant and skeletal muscle relaxant effects, without any marked toxic side effects such as nausea or vomiting at standard dosage levels, i.e. low toxicity. The compound has a similar spectrum of pharmodynamic activity to diazepam but, in certain significant respects, it manifests a more potent activity and/or a more prolonged effect than the latter as will be more fully described hereinafter.

The 7-R-1-propargyl - 5 - phenyl-3H-1,4-benzodiazepin-2(1H)-one derivatives of this invention may be prepared by any of the methods known to be suitable for the preparation of other 1,4-benzodiazepines. Advantageously, they are prepared by the reaction of a compound of the following general formula:

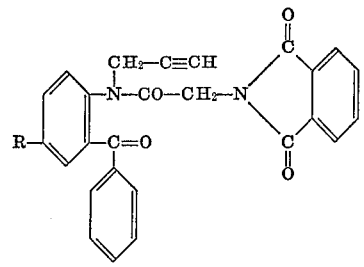

in which R has the same significance as in formula I hereinbefore with at least one molar equivalent of hydrazine or hydrazine hydrate. Preferably, the compound II is reacted with 2 to 3 molar equivalents of hydrazine or hydrazine hydrate for each molar equivalent of the compound II. The reaction is conveniently effected in a suitable reaction solvent in which one, or preferably both, reactants are soluble and which is inert, or substantially so, to both. Suitable solvents include lower aliphatic alcohols such, for example, as methanol and ethanol, and hydrocarbon solvents such, for example, as xylene and toluene. Temperature is not a critical aspect of this process and thus the reaction can be effected at room temperature or an elevated temperature, such as the reflux temperature of the solvent. Temperatures lower than room temperature may be used but the reaction times then generally have to be somewhat longer and no useful purpose is served by operating at such temperatures.

Working up usually raises no difficulty. The phthalyl hydrazide by-product is removed, typically by filtration and the filtrate poured into water. The desired 1,4-benzodiazepine may be recovered by extraction with an organic solvent such as chloroform, followed by evaporation of the chloroform extract and recrystallization of the residue from organic solvents such as methanol or a methanol-water mixture.

The 2-(N - propargyl) - phthalimidoacetamido-5-R-benzophenones, for example the 2-(N - propargyl)-5-chlorobenzophenones, which themselves are novel compounds, may be prepared by condensation of a 2-propargyl - 5 - R - benzophenone with phthalimido-acetyl-chloride. The condensation is conveniently affected in the presence of a solvent such, for example, as chloroform, at the reflux temperature of that solvent.

Specific examples illustrating the preparation of a typical 2-propargylamino - 5 - chlorobenzophenone and its conversion to the preferred 1,4-benzodiazepine, namely,, 7-chloro-1-propargyl - 5 - phenyl-3H-1,4-benzodiazepine-2(1H)-one, now follow:

EXAMPLE 1

Part A.—2-Propargylamino-5-chlorobenzophenone 46.3 gms. (0.2 moles) of 2-amino - 5 - chlorobenzophenone were dissolved in 100 mls. (1.28 moles) of propargyl bromide and the mixture refluxed for 4 hours. Thereafter, the whole was evaporated to dryness and the residue recrystallized from methanol to give 32.4 gms. (60.2%) of the desired 2-propargylamino-5-chlorobenzophenone; melting point 92° to 93° C.

Part B 2.7 gms. (0.01 mole) of the 2 - propargylamino-5-chlorobenzophenone obtained by the procedure of Part A and 2.23 gms. (0.01 mole) of phthalimido-acetyl-chloride were added to 30 mls. of chloroform and the whole was refluxed overnight. Thereafter, the reaction mixture was evaporated to dryness and the residue recrystallized from methanol to give 2.66 gms. (58.3%) of the desired 2 - (N-propargyl) - phthalimidoacetamide-5-chlorobenzophenone. Melting point: 176° C.

*Elementary Analysis.*—Calculated for $C_{26}H_{17}ClN_2O_4$ (percent): C, 68.34; H, 3.75; Cl, 7.76; N, 6.13. Found (percent): C, 68.69; H, 3,84; Cl, 8.67; N, 6.32.

*Infrared Analysis.*—The infrared spectrum, taken in a Nujol mull, showed characteristic absorption bands and peaks at the following wavelengths:

| alkyne | C—H | 3270 cm.$^{-1}$ |
|---|---|---|
| | C≡C | 2120 (weak) |
| | C=O | 1680 |

Part C.—7-Chloro-1-propargyl-5-phenyl-3H-1,4-benzodiazepine-2(1H)-one

A suspension of 22.8 gms. (0.05 moles) of 2-(N-propargyl) - phthalimidoacetamido - 5-chlorobenzophenone in 250 mls. ethanol containing 7.5 gms. hydrazine hydrate (0.15 moles) was heated under reflux for 2 hours, at the end of which time the reaction mixture was set aside overnight at ambient (25° C.) temperature. Thereafter, the crystalline phthalyl hydrazide which had precipitated out was removed by filtration and washed with 3×50 ml. aliquots of chloroform. The filtrate and washings were diluted with water and exhaustively extracted with chloroform. The chloroform extract was then evaporated and the residue washed with 100 mls. hexane to promote crystallization. The crude 7-chloro-1-propargyl-3H-1,4-benzodiazepine - 2(1H) - one was recrystallized from a methanol-water mixture to give 10.5 gms. (71.4%) of the pure product. Melting point: 140° to 142° C.

*Elementary Analysis.*—Calculated for $C_{18}H_{13}ClN_2O$ (percent): C, 70.01; H, 4.24; Cl, 11.48; N, 9.08. Found (percent): C, 70.08; H, 4.38; Cl, 11.72; N, 9.01.

*Infrared Spectrum.*—The infrared spectrum of this compound, taken in a Nujol mull, showed characteristic absorption bands and peaks at the following wavelengths:

| alkyne | C—H | 3270 cm.$^{-1}$ |
|---|---|---|
| | C≡C | 2120 (weak) |
| | C=O | 1680 |

The reactions involved in Parts A to C of the foregoing example relating to the conversion of 2-amino-5-chlorobenzophenone into 7 - chloro - 1 - propargyl - 5-phenyl - 3H - 1,4 - benzodiazepine-2(1H)-one through the novel intermediate 2-(N-propargyl)-phthalimidoacetamido-5-chlorobenzophenone are illustrated in the following flow sheet.

Part A

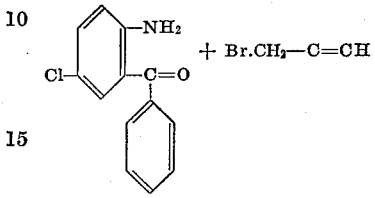

Part B

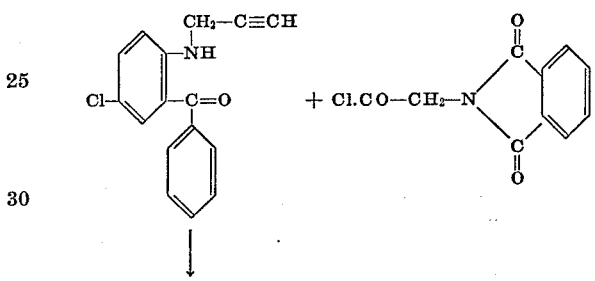

Part C

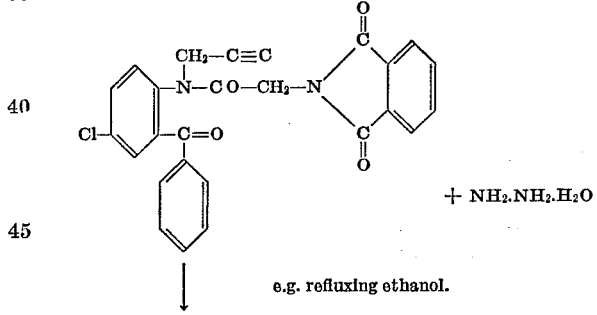

e.g. refluxing ethanol.

Part D

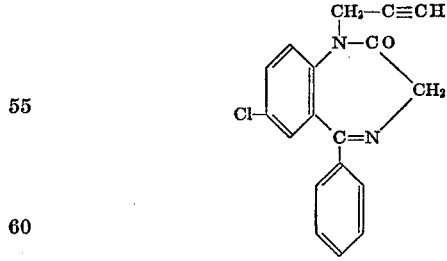

It has been found in accordance with the present invention that the compounds of Formula I, and especially the preferred compound, 7-chloro-1-propargyl-5-phenyl-3H-1,4-benzodiazepine-2(1H)-one, have marked pharmacological activity in that such compounds act as depressants on the central nervous system. Compounds possessing such activity may have valuable therapeutic utility as potential medicaments in the form of pharmaceutical compositions as tranquilizers, spasmolytics, antishock agents and potentiators of various drugs such as analgesics. Because of their low toxicity they demonstrate a wide margin of safety in both acute and subacute experiments.

The effectiveness and toxicity of a preferred compound 7-chloro-1-proparyl-5-phenyl - 3H - 1,4 - benzodiazepine-2(1H)-one (Compound A) of this invention, were determined by standard pharmacological tests. In these tests, as is customary in pharmacological investigations, albino mice of uniform age and weight and from a standard strain were used as the primary test object since they are readily available and since the relative activity of C.N.S.—acting drugs in these animals as compared to useful drug actions in man is well known.

Drugs which interfere with motor coordination by causing ataxia and/or muscle relaxation are generally regarded to possess sedative hypnotic activity. Two groups of experiements were therefore designed to test the effect of the Compound A and, for comparative purposes, diazepam on motor coodination. In the first group of experiments a slowly rotating 1 inch diameter rod was used to test the effect of various dose levels of the two compounds on coordination in mice. From preliminary experiments, an optimum speed of 6 r.p.m. was chosen on the basis that untreated mice showed no difficulty in maintaining their position on the rotating bar for two minutes or longer. All treated mice (10 animals/dose level) were scored (positive or negative) for ability to remain on the roto-rod at 30, 60, 120, 180 minutes and 4 and 5 hours after drug administration. All results were analyzed for $ED_{50}$ values by the method of Litchfield & Wilcoxan, using the 30 minute post-treatment result.

In the second group of experiments an inclined stainless steel surface was used to test motor weakness. From preliminary experiments an optimum slope of 30° was found not to alter movement of untreated mice. Various dose levels of Compound A and diazepam were given per os to mice (10 animals/dose level) and then all mice were evaluated (positive or negative) for motor performance on the inclined surface at various time intervals after treatment. The results for the 30 minute post-treatment period only were statistically analyzed for $ED_{50}$ values using the method of Litchfield and Wilcoxan.

*Results:* The $ED_{50}$ data analysis of the degre of ataxia, as measured by roto-rod performances, induced by Compound A and diazepam is shown in Table No. I.

TABLE I

| Compound | Number of mice tested | Data analysis in mg./kg. | | Potency with range |
|---|---|---|---|---|
| | | $ED_{50} \pm$ S.E.M. | $ED_{50}$ range* | |
| A | 50 | 4.1±0.31 | (2.67–6.27) | 2.3 (1.42–3.73) |
| Diazepam | 40 | 9.4±0.54 | (7.12–12.40) | |

*For 95% confidence limits.

From this analysis it will be seen that Compound A was found to be 2.3 times more potent than diazepam ($ED_{50}$ values of 4.1±0.31 and 9.4±0.54 mg./kg., respectively). The effect of various dose levels of Compound A and Diazepam on roto-rod performance with respect to time in mice is summarised in Table II which follows.

TABLE II

| Compound | Dose in mg./kg. | Percentage of animals affected with respect to time* | | | | | |
|---|---|---|---|---|---|---|---|
| | | 30 min. | 1 hr. | 2 hr. | 3 hr. | 4 hr. | 5 hr. |
| A | 1.0 | 0 | 0 | 0 | 0 | 0 | 0 |
| | 2.0 | 30 | 10 | 0 | 0 | 0 | 0 |
| | 4.0 | 60 | 50 | 50 | 40 | 50 | 30 |
| | 8.0 | 80 | 80 | 50 | 40 | 70 | 40 |
| | 16.0 | 100 | 100 | 90 | 90 | 80 | 80 |
| Diazepam | 5 | 20 | 20 | 20 | 20 | 10 | 0 |
| | 10 | 60 | 20 | 20 | 20 | 10 | 0 |
| | 15 | 70 | 40 | 20 | 20 | 20 | 10 |
| | 20 | 80 | 70 | 70 | 60 | 40 | 40 |

*10 mice/dose level.

An examination of the results in Table II reveals that at dose levels of 4.0 and 8.0 mg./kg. Compound A was significantly effective even 5 hours after administration, whereas diazepam at dose levels of 5 and 10 mg./kg. was not effective at this time.

The results of the inclinded plane test for muscle relaxation are summarised in Table No. III which follows.

TABLE III

| Compound | Number of mice | $ED_{50}$ (muscle relaxation) data analysis (mg./kg.) | | KV-VIII-1 vs. diazepam with range |
|---|---|---|---|---|
| | | $ED_{50} \pm$ S.E.M. | $ED_{50}$ range* | |
| A | 50 | 6.5±0.63 | (3.61–11.7) | 1.76 (1.09–2.83) |
| Diazepam | 40 | 11.5±0.75 | (8.21–16.10) | |

*Range for 19/20 confidence limits.

Compound A was found to be 1.76 times more potent than diazepam ($ED_{50}$ values of 6.5±0.63 and 11.5±0.75 mg./kg., respectively).

TABLE IV

| Treatment | | Percentage of animals affected with respect to time* | | | | | |
|---|---|---|---|---|---|---|---|
| Compound | Dose, mg./kg. | 30 min. | 1 hr. | 2 hr. | 3 hr. | 4 hr. | 5 hr. |
| A | 1.0 | 0 | 0 | 0 | 0 | 0 | 0 |
| | 2.0 | 20 | 10 | 0 | 0 | 0 | 0 |
| | 4.0 | 30 | 30 | 50 | 50 | 50 | 30 |
| | 8.0 | 50 | 50 | 50 | 50 | 60 | 60 |
| | 16.0 | 100 | 100 | 100 | 90 | 70 | 70 |
| Diazepam | 5 | 20 | 20 | 10 | 0 | 0 | 0 |
| | 10 | 40 | 40 | 40 | 30 | 30 | 0 |
| | 15 | 50 | 50 | 40 | 40 | 20 | 0 |
| | 20 | 80 | 70 | 60 | 60 | 50 | 50 |

*10 animals/dose level.

Again it can be seen (Table No. IV) that at low dose levels (4.0 and 8.0 mg./kg.) Compound A was significantly effective 5 hours after administration whereas diazepam at dose levels of 10 and 15 mg./kg. did not show any effect at this time.

Anticonvulsant Activity

The anticonvulsant activity of Compound A was studied and compared to that of Diazepam using several chemically-induced convulsion tests in albino mice. The tests comprised convulsions induced by strychnine, pentylenetetrazol (metrazole) and nicotine. All anticonvulsant treatment was carried out using the oral route of administration and all convulsants were administered at the $Cd_{95}$ (convulsant dose) of each compound determined from trial experiments. The criteria used to judge the efficacy of Compound A and diazepam included protection against clonic-tonic convulsions and/or death. Dose response curves for the various treatments were constructed and $ED_{50}$ values obtained using the method according to Litchfield and Wilcoxan.

*Results:* The protective effect or $PD_{50}$ dose level of Compound A and Diazepam against various chemically-induced convulsions in mice is shown in Table No. V which follows:

TABLE V

| Chemical convulsant | Number of mice, compound A/ Diazepam | $PD_{50}$ (± S.E.M.) dose with range | | Potency |
|---|---|---|---|---|
| | | Compound A | Diazepam | |
| Strychnine | 50/40 | 3.4±0.32 (2.83–4.08) | 13±2.4 (9.0–18.9) | 3.8 (2.6–5.7) |
| Metrazole | 50/50 | 1.7±0.36 (1.16–2.48) | 2.3±0.7 (1.68–3.02) | N.S. |
| Nicotine | 50/40 | 2.0±0.36 (1.46–2.74) | 2.5±0.40 (1.05–3.38) | N.S. |

Values in brackets represent range for 95% confidence limits. Referring to the foregoing table, it is apparent that against strychnine-induced convulsions Compound A was 3.8 times more effective than diazepam ($PD_{50}$ dose levels of 3.4 and 13.0 mg./kg., respectively). Against either metrazole or nicotine induced convulsions both Compound A and Diazepam were comparably effective.

BEHAVIOURAL EFFECTS

Fighting Mouse Test

The method used in these experiments was essentially that described by Tedeschi et al. Male and female albino mice weighing 18–20 g. were randomly paired, placed into a special plexiglass chamber constructed with a stainless steel floor grid and subjected to an electrical footshock of 1000 Volts 5 milliamperes for 3 minutes. All mice were initially tested for their fighting tendency and only those showing a positive response, i.e. 3 or more fighting episodes during application of the footshock, were used for subsequent experimentation. Eight or ten pairs of mice were treated for each dose level of Compound A and diazepam studied. All drug treatment was carried out using the oral route of administration and all testing was done 60 minutes after treatment. Accumulated quantal results, i.e. fighting or not, were statistically analyzed for $ED_{50}$ values according too the method of Litchfield and Wilcoxan.

*Results:* A data analysis of the results of this experiment is shown in Table No. VI which follows.

TABLE VI

| Compound | Number of mice | $ED_{50}$ data analysis in mg./kg. | | |
|---|---|---|---|---|
| | | $ED_{50} \pm$ S.E.M. | $ED_{50}$ range* | Potency |
| A | 64 | 10±3.5 | (5.6–18.0) | |
| Diazepam | 64 | 7.0±3.6 | (3.2–15.4) | N.S. |

*For 95% confidence limits.

Note.—N.S.=Not significant.

From the table it is apparent that both Compound A and Diazepam significantly depressed the fighting behaviour of mice subjected to footshock ($ED_{50}$ values of 10±3.5 and 7.0±3.6 mg./kg., respectively). A potency comparison of the $ED_{50}$ values revealed that both compounds were about equivalent in potency.

OBSERVATIONS OF BEHAVIOURAL EFFECTS OF COMPOUND A IN THE SQUIRREL MONKEY

Squirrel monkeys (*Saimiri sciureus*) of both sexes and ranging in weight from 500–700 g. were used in these experiments. Two male and two female animals were used for each dose level of Compound A tested. Food and water were withdrawn for 2½ hours prior to the oral administration of the various treatments. Following drug treatment all animals were observed at 30 minutes, 1, 2, 3, 4 and 24 hours and behavioural changes such as depression, ataxia and taming were recorded.

*Results:* The results are summarised in Table VII which follows:

fear, significantly more so than monkeys treated with an equivalent dose level of Diazepam.

Acute Toxicity

One of the characteristics of the compounds of this invention is their low toxicity as shown below.

A standard 14 day acute toxicity study of Compound A was carried out utilizing the oral route of administration in albino mice. Ten mice equally divided as to sex were employed per dose level of each compound tested and the accumulated 14-day mortality data were statistically analysed using the method of Litchfield & Wilcoxan. The compound was administered in a 0.5% aqueous CMC (carboxymethyl cellulose) solution.

*Results:* When given orally to mice the $LD_{50}$ for Compound A was found to be 670±88.0 mg./kg., which confirms that the toxicity of the compounds of the present invention is very low.

The compounds of the invention are conveniently presented, for administration to humans or animals, formulated in pharmaceutical form. Thus, the invention provides, in another aspect, pharmaceutical compositions containing as the active ingredient at least one compound of the general formula I in association with a non-toxic pharmaceutical carrier or excipient. The products may be administered, in the form of suitable compositions, parenterally, orally or rectally. In particular, such compositions may take the form of tablets, pills, coated or progressively splitting tablets, cachets, capsules, granules, syrup, suppositories, or injectable solutions or suspensions in ampoules or multi-dose flasks.

The choice of carrier is determined by the chosen form of administration, the solubility of the compounds and standard pharmaceutical practice. For further information about suitable pharmaceutical carriers that may be used in the compositions of this invention, reference may be made to "Remington's Practice of Pharmacy" by E. W. Marten and E. F. Cook, a well known reference text in this field. The following are examples of illustrative pharmaceutical compositions according to this invention.

EXAMPLE A

| Ingredient: | Content mg./tablet |
|---|---|
| Compound A | 5.0 |
| Lactose | 88.0 |
| Starch | 40.0 |
| Gelatin | 1.5 |
| Magnesium Stearate | 0.5 |
| | 135.0 |

TABLE VII

| Treatment | | | Average group behavioural score with respect to time | | | | | | |
|---|---|---|---|---|---|---|---|---|---|
| Compound | Dose, mg./kg. | Behaviour parameter | 0 | 3 min. | 1 hr. | 2 hr. | 3 hr. | 4 hr. | 24 hr. |
| A | 1.0(4) | Sedation | 0 | 0 | 1+ | 0 | 0 | 0 | 0 |
|   |   | Ataxia | 0 | 0 | 0 | 0 | 0 | 0 | 0 |
|   |   | Taming | 0 | 0 | 1+ | 1+ | 0 | 0 | 0 |
|   | 2.5(4) | Sedation | 0 | 0 | 4+ | 4+ | 4+ | 2+ | 0 |
|   |   | Ataxia | 0 | 0 | 3+ | 4+ | 4+ | 1+ | 0 |
|   |   | Taming | 0 | 0 | 4+ | 4+ | 4+ | 3+ | 0 |
| Diazepam | 2.5(4) | Sedation | 0 | 0 | 0 | 0 | 0 | 0 | 0 |
|   |   | Ataxia | 0 | 0 | 0 | 0 | 0 | 0 | 0 |
|   |   | Fear | 0 | 0 | 1+ | 0 | 0 | 0 | 0 |

Note.—Scoring: 0 represents normal or no-effect level, 1–4+ represents increasing effect. Values in brackets represent number of animals in group.

From Table No. VII it is apparent that Compound A at a dose level of 1.0 mg./kg. did induce an observable taming effect of short duration in the squirrel monkey. This effect was comparable in degree and duration to that observed with Diazepam at the higher dosage of 2.5 mg./kg. At the highest dose level of Compound A tested (2.5 mg./kg.) significant sedation and ataxia was evident for at least 4 hours post-treatment. At this dose level these animals were found to be remarkably tame, and without

EXAMPLE B

| Ingredient: | Content mg./tablet |
|---|---|
| Compound A | 5.0 |
| Lactose | 140.0 |
| Corn starch | 60.0 |
| Talc | 20.0 |
| Magnesium Stearate | 5.0 |
| | 230.0 |

A large variety of compositions can be made by substituting other compounds of this invention. The compounds will be used in the amounts indicated in accordance with the procedures well known and described in the Marten & Cook text. The pharmaceutical compositions of this invention may contain, in addition to the active ingredient of formula I, one or more other therapeutically active substances compatible therewith and producing desirable complementary effects.

When the compounds are to be used in human therapy a daily dose of from about 3 mg. to about 200 mg., generally from about 10 mg. to about 100 mgs., is usually satisfactory but the exact dosage administered will vary depending upon such factors as the symptom being treated, the age, health and weight of the recipient, kind of concurrent treatment, if any, and the nature of the effect desired.

It will be understood that the invention is not limited to the specific compounds and compositions shown and described, as obvious modifications will be apparent to one skilled in the art, and the invention, therefore, is to be limited only by the scope of the appended claims.

What is claimed is:

1. A 2-phthalimdoacetamido-benzophenone compound having the formula:

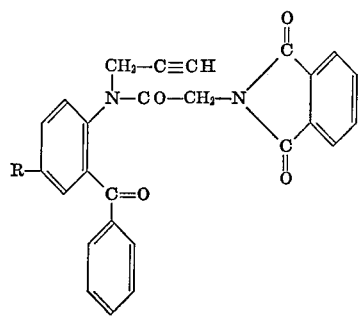

wherein R represents halogen.

2. 2-(N-Propargyl)-phthalimdoacetamido - 5 - chlorobenzophenone.

References Cited
UNITED STATES PATENTS
| | | | |
|---|---|---|---|
| 3,371,085 | 2/1968 | Reeder et al. | 260—239.3 D |
| 3,429,874 | 2/1969 | Topliss | 260—239.3 D |

FOREIGN PATENTS
| | | | |
|---|---|---|---|
| 21,830 | 10/1967 | Japan | 260—326 N |

JOSEPH A. NARCAVAGE, Primary Examiner

U.S. Cl. X.R.

260—239.3 D; 424—244